United States Patent [19]  [11] 3,957,747
Austin et al.  [45] May 18, 1976

[54] 6-HYDROXYPYRID-2-ONE AZO DYESTUFFS

[75] Inventors: Peter William Austin; David Shaw Leitch, both of Manchester, England

[73] Assignee: Imperial Chemical Industries Limited, London, England

[22] Filed: Nov. 18, 1974

[21] Appl. No.: 524,869

Related U.S. Application Data

[63] Continuation-in-part of Ser. No. 238,620, March 27, 1972, abandoned.

[30] Foreign Application Priority Data

May 18, 1971  United Kingdom............... 15474/71

[52] U.S. Cl................................ 260/153; 260/154; 260/155; 260/283 CN; 260/287 R; 260/289 R; 260/468 K
[51] Int. Cl.² ................. C09B 62/08; C09B 62/16; C09B 62/24; C09B 62/50
[58] Field of Search..................... 260/153, 154, 155

[56] References Cited
UNITED STATES PATENTS

| | | | |
|---|---|---|---|
| 1,893,646 | 1/1933 | Holzach et al.............. | 260/155 X |
| 1,898,911 | 2/1933 | Straub et al. ................ | 260/155 X |
| 1,969,463 | 8/1934 | Holzach et al................... | 260/155 |
| 2,044,329 | 6/1936 | Raeck et al...................... | 260/155 |
| 2,231,705 | 2/1941 | Dickey............................. | 260/155 |
| 2,883,374 | 4/1959 | Enders............................ | 260/146 R |
| 2,910,464 | 10/1959 | Fasciati et al...................... | 260/153 |
| 3,117,959 | 1/1964 | Dehnert........................... | 260/155 |
| 3,234,206 | 2/1966 | Liechti........................... | 260/155 |
| 3,725,383 | 4/1973 | Austin et al..................... | 260/146 T |

*Primary Examiner*—Floyd D. Higel
*Attorney, Agent, or Firm*—Cushman, Darby & Cushman

[57]  ABSTRACT

A dyestuff of the formula

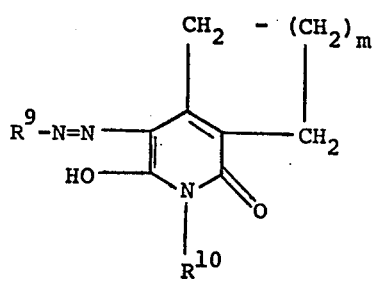

wherein $m$ is 1, 2 or 3; $R^9$ is

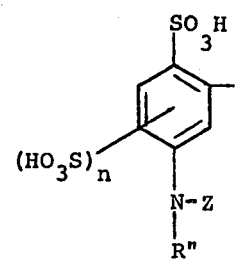

wherein $n$ is 0 or 1 and $R''$ is hydrogen or lower alkyl or

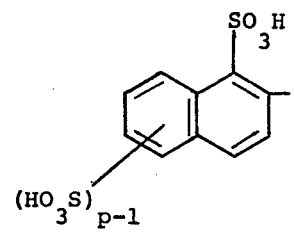

wherein $p$ is 1, 2 or 3; $R^{10}$ is $C_{1-6}$ alkyl, benzyl, sulphobenzyl, phenyethyl, sulphophenylethyl,

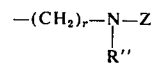

wherein $r$ is 2 to 6,

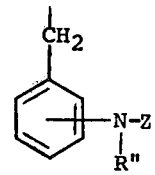

or

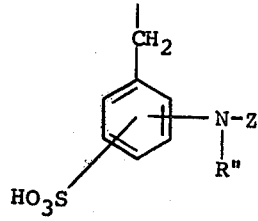

wherein $R''$ has the meaning given above and the dyestuff as a whole contains only one group represented by Z, and Z is a cellulose-reactive group. The dyestuff is useful in dyeing and printing cellulose, polyamide and wool textile materials. Textile dyes with the above dyestuff exhibits good fastness to washing and to bleaching and good resistance to acids and alkalies.

5 Claims, No Drawings

6-HYDROXYPYRID-2-ONE AZO DYESTUFFS

This is a Continuation-in-Part of our earlier application Ser. No. 238,620 filed March 27, 1972, now abandoned.

This invention relates to new azo dyestuffs of the 6-hydroxypyrid-2-one series.

The new dyestuffs are characterized by presence in the molecule of the following structural element:

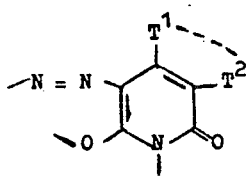
(1)

wherein one of $T^1$ and $T^2$ is $CH_2$, and the other forms a chain of 2 to 4 carbon atoms, which may be part of a further ring system, the properties of the dyestuff being determined by the substituents attached to the three free valencies depicted, as well as $T^1$ and $T^2$.

As a general rule, the more readily available new dyestuffs can be represented by the general formula:

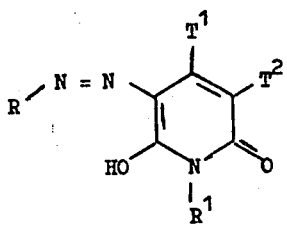
(2)

wherein R represents an aromatic radical, $R^1$ represents H, $NH_2$ or an alkyl, aralkyl, cycloalkyl, aryl or heterocyclic group which may be substituted, and $T^1$ and $T^2$ have the meanings stated above.

The present specification is particularly concerned with dyestuffs of the above type which also contain at least one sulphonic acid group and one or more cellulose reactive groups. Such dyes can be used as reactive dyes for silk, wool, nylon, natural or regenerated cellulose fibrous materials.

$T^1$ and $T^2$ together may represent any group of atoms having a chain of 3, 4 or 5 carbon atoms connected to the pyridine nucleus through at least one terminal $CH_2$ group. As examples of such groups, there may be mentioned alkylene radicals, e.g. 1,3-trimethylene, 1,4-tetramethylene and 1,5-pentamethylene which may be substituted, provided that one terminal methylene group is left, e.g. by methyl or by a further, preferably homocyclic, ring system fused across adjacent carbon atoms of $T^1$ and $T^2$, e.g. a 2,ω-tolylene, ω,ω'-o-xylylene, 2,ω-ethylphenylene of the formulae:

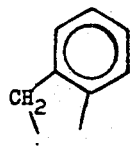
2(a)

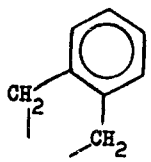
2(b)

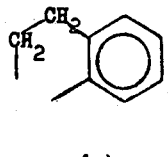
2(c)

In general, it is preferred that $T^1$ and $T^2$ together represent $—(CH_2)_3—$ or, more especially, $—(CH_2)_4—$.

The alkyl group represented by $R^1$ in formula (2) may be of any length but is preferably one of those containing up to 6 carbon atoms, e.g. methyl, ethyl, n-propyl, n-butyl, n-pentyl, n-hexyl, β-aminoethyl, γ-dimethylaminopropyl, β-(pyridinium-1-yl)ethyl and the alkyl group may bear a cellulose reactive substituent.

As examples of aralkyl groups represented by $R^1$ there may be mentioned: benzyl, and β-phenylethyl, which may bear a cellulose reactive substituent.

As an example of cycloalkyl groups represented by $R^1$ there may be mentioned cyclohexyl and 2-methyl cyclohexyl.

As examples of aryl or substituted aryl radicals represented by $R^1$ there may be mentioned more especially redicals of the benzene series in which the benzene ring or rings may be substituted, e.g. by chlorine, bromine, methyl, ethyl, nitro, carboxylic acid, sulphonic acid, aminosulphonyl, amino, acylamino and azinylamino groups in which the acyl or azinyl groups may be cellulose-reactive.

As examples of heterocyclic or substituted heterocyclic groups represented by $R^1$ there may be mentioned, more particularly, 5- and 6-membered monocyclic heterocyclic radicals, which may be substituted, e.g. pyrid-2-yl, thiazol-2-yl, piperidin-1-yl, and morpholin-1-yl.

The aromatic radical which is represented by R may be any aromatic carbo- or hetero-cyclic radical which may carry substituents, e.g., alkyl, cycloalkyl or aralkyl, alkoxy, aralkoxy, aryloxy, acyloxy, benzeneazo, naphthylazo, amino, alkylamino, dialkylamino, arylamino, N-alkylarylamino, aralkylamino, acylamino, carboxylic acid, aminocarbonyl and its N-substituted derivatives, alkoxycarbonyl, aminosulphonyl and its N-substituted derivatives, alkyl sulphonyl, alkylthio, aralkylthio, nitro, cyano, trifluoromethyl, sulphonic acid groups and halogen atoms; also cellulose reactive groups.

As examples of cellulose-reactive groups, there may be mentioned vinyl sulphone and aliphatic sulphone groups which contain a halogen atom or sulphate ester groups in β-position to the sulphur atom, e.g. β-chloroethyl- or β-sulphatoethylsulphone and β-sulphatoethylsulphonylamino groups, α,β-unsaturated acyl radicals of aliphatic carboxylic acids for example, acrylic acid, α-chloro-acrylic acid, propiolic acid, maleic acid and mono- and dichloro- maleic acids; also the acyl radicals of acids which contain a substituent which reacts with cellulose or polyamides in the presence of an alkali, e.g. the radical of a halogenated aliphatic acid such as chloroacetic acid, β-chloro and β-bromo-propionic acids and α,β-dichloro- and -dibromo- propionic acids. Other examples of cellulose or polyamide — reactive groups are tetrafluoro cyclo butane carbonyl, trifulorocyclo butene carbonyl, tetrafluorocyclobutylethenyl carbonyl, trifluorocyclobutaneethenylcarbonyl, and heterocyclic radicals which contain 2 or 3 nitrogen atoms in the heterocyclic ring and at least one cellulose- or polyamide- reactive substituent on a carbon atom of the ring.

As examples or such heterocyclic radicals, there may be mentioned, for example

2:3-dichloro-quinoxaline-5- or
—6-sulphonyl,
2:3-dichloro-quinoxaline-5- or -6-carbonyl,
2:4-dichloro-quinazoline-6- or -7- sulphonyl,
2:4:6-trichloro-quinazoline-7- or -8- sulphonyl,
2:4:7- or 2:4:8-trichloro-quinazoline-6-sulphonyl,
2:4-dichloro-quinazoline-6-carbonyl,
1:4-dichloro-phthalazine-6-carbonyl,
β(4:5-dichloro-pyridazon-1-yl)propionyl,
2:4-dichloro-pyrimidine-5-carbonyl,
1-(phenyl-4-carbonyl)-4:5-dichloro-pyridazone,
1-(phenyl-4-sulphonyl)-4:5-dichloro-pyridazone, and, more particularly s-triazin-2-yl and pyrimidin-2-yl or —4-yl radicals which contain on at least one of the remaining 2,4- and 6-positions, a bromine or, preferably, a chlorine atom, a sulphonic acid group, a thiocyanato group, an aryloxy or arylthio group containing an electronegative substituent such as sulphophenoxy, sulphophenylthio, nitrosulphophenoxy, disulphophenoxy and sulphonaphthoxy, or a group of the formula:

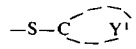  (3)

wherein $Y^1$ represents a group of atoms necessary to form a 5- or 6- membered heterocyclic ring which may carry substituents or form part of a fused ring system; or a quaternary ammonium or pyridinium group; or a group of the formula:

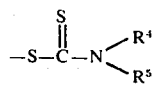  (4)

wherein $R^4$ and $R^5$ each represents the same or different alkyl, cycloalkyl, aryl or aralkyl group, or $R^4$ and $R^5$ together form, together with the nitrogen atom, a 5- or 6- membered heterocyclic ring; or a group of the formula:

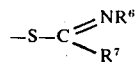  (5)

wherein $R^6$ and $R^7$ may be the same or different and each represents a hydrogen atom or an alkyl, aryl or aralkyl group.

In the cases where the pyrimidine ring or triazine ring carries only one such reactive substituent, the said ring may have a non-reactive substituent on the remaining carbon atoms.

By a non-reactive substituent there is meant a group which is bound by a covalent bond to a carbon atom of the triazine or pyrimidine nucleus, which covalent bond is not ruptured under the conditions used for application of the reactive dye.

As examples of such substituents, there may be mentioned, for example, primary amino and hydroxyl groups, also mono- or disubstituted amino groups, etherified hydroxyl and etherified mercapto groups; in the case of substituted amino groups, this class includes, for example, mono- and di-alkylamino groups in which the alkyl groups preferably contain at most 4 carbon atoms, and which may also contain substituents for example, hydroxyl or alkoxy groups, and phenylamino and naphthylamino groups preferably containing sulphonic acid substituents; in the case of etherified hydroxyl and mercapto groups, this class includes, for example, alkoxy and alkylthio groups preferably those of low molecular weight, i.e. having up to 4 carbon atoms and phenoxy, phenylthio, naphthoxy or naphthylthio groups; as particular examples of all these classes there may be mentioned for example:

methylamino,
ethylamino,
dimethylamino,
β-hydroxyethylamino,
di-(β-hydroxyethyl)-amino,
β-chloroethylamino,
cyclohexylamino,
anilino,
sulphophenylamino,
disulphophenylamino,
N-methylsulphophenylamino,
N-β-hydroxyethylsulphophenylamino,
mono-, di, and trisulphonaphthylamino,
sulpho-o-tolylamino,
carboxyphenylamino and sulphocarboxyphenylamino,
N-ω-sulphomethylphenylamino,
methoxy, ethoxy, and butoxy,
phenoxy, methylphenoxy and chlorophenoxy and phenylthio groups.

Chlorine atoms or cyano, nitro, carboxy and carbalkoxy groups in the 5-position of a pyrimidyl radical come into the category of non-reactive substituents.

Thus, in formula (2) above, the symbol R may represent a radical of the benzene or naphthalene series which contains cellulose-reactive group bound directly in some cases to a nuclear carbon atom but more usually is bound to a nuclear carbon atom through a linking amino group. Typical radicals include for example, not only phenyl or naphthyl, but also stilbene, diphenyloxide, diphenylmethane, diphenylurea, diphenoxyethane, and diphenylamine radicals, which contain at least one, and preferably two, sulphonic acid groups.

Alternatively, or in addition, a cellulose-reactive group may be present as a substituent in $R^1$ of formula (2) especially where this represents an alkyl or benzyl radical.

Within the broad class of reactive dyes discussed above, the following sub-class is especially preferred:

Dyestuffs of the formula:

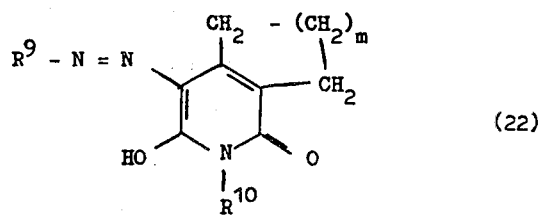  (22)

wherein
  m is 1, 2 or 3
  $R^9$ is selected from the group consisting of

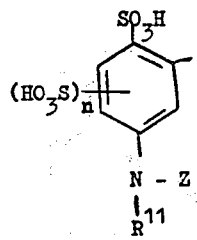

where n is 0 or 1 and $R^{11}$ is H or lower alkyl and

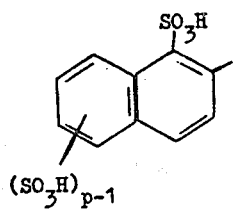

where p is 1, 2 or 3;
  $R^{10}$ is selected from the group consisting of $C_{1-6}$ alkyl, benzyl, sulphobenzyl, phenylethyl, sulphophenylethyl,

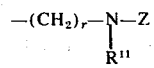

where r is 2 to 6,

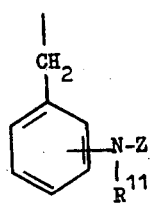

and

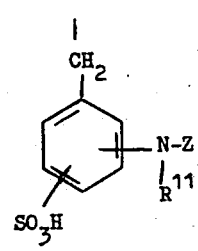

$R^{11}$ has the meaning given above and the dyestuff as a whole contains only one group represented by Z;
  Z is a cellulose-reactive group selected from the group consisting of 2,3-dichloroquinoxalin-5-sulphonyl,
2,3-dichloroquinoxalin-5-carbonyl,
2,3-dichloroquinoxalin-6-sulphonyl,
2,3-dichloroquinoxalin-6-carbonyl,
2,4-dichloroquinazolin-6-sulphonyl,
2,4-dichloroquinazolin-6-carbonyl,
2,4-dichloroquinazolin-7-sulphonyl,
2,4,6-trichloroquinazolin-7-sulphonyl,
2,4,6-trichloroquinazolin-8-sulphonyl,
2,4,7-trichloroquinazolin-6-sulphonyl,
2,4,8-trichloroquinazolin-6 -sulphonyl,
1,4-dichlorophthalazin-6-carbonyl,
β(4,5-dichloropyridazon-1-yl)propionyl,
2,4-dichloropyrimidin-5-carbonyl,
4-(4',5'-dichloropyridazon-1yl)benzoyl,
4-(4',5'-dichloropyridazon-1yl)phenylsulphonyl,
2,4-dichloropyrimid-6-yl,
2,4,5-trichloropyrimid-6-yl,
2,4-dichloro-5-cyanopyrimid-6-yl,
2,4-difluoro-5-chloropyrimid-6-yl,
4-chloro-6-methyl-2-methylsulphonylpyrimid-4-yl,
2,4-dichloro-5-bromopyrimid-6-yl,
2,4-dichloropyrmmidin-5-sulphonyl,
2,2,3,3-tetrafluorocyclobutylcarbonyl,
2,3,3,-trifluorocyclobut-1-enyl carbonyl,
β-(2,2,3,3-tetrafluorocyclobutyl)acryloyl,
β-(2,3,3-trifluorocyclobut-1-enyl)acryloyl,
2-chlorobenzthiazol-6-carbonyl,

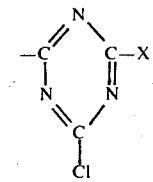

in which X is Cl, $NH_2$, lower alkoxy, phenoxy, sulphophenoxy, lower alkylamino, di(lower alkyl)amino,

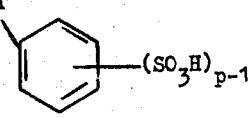

and

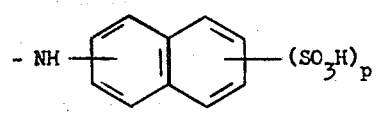

in which p is 1, 2 or 3,

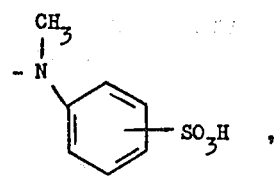

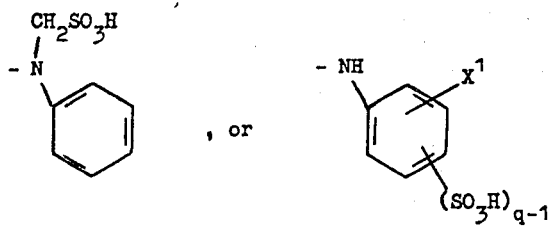

in which $X^1$ is $CH_3$, Cl, $OCH_3$ or $CO_2H$ and $q$ is 1 or 2,

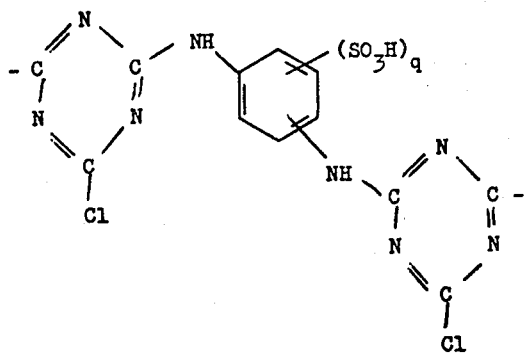

in which $q$ and X have the meanings stated above and

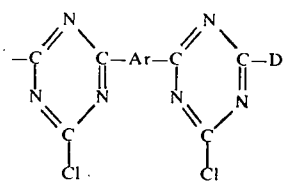

in which Ar is the N,N'-divalent radical of a diamine selected from the group consisting of 4,4'-diaminodiphenylether, 4,4'-diaminodiphenylsulphone, 4,4'-diaminodiphenoxyethane 2,2'-disulphonic acid, 2,6-naphthalene-4,8-disulphonic acid, benzidine-2,2'-disulphonic acid, 4,4'-diaminodiphenylurea-2,2'-disulphonic acid, 4,4'-diaminostilbene-2,2'-disulphonic acid, 1,3-diaminobenzene-4,6-disulphonic acid and 4,4'-diaminodiphenyl sulphide-2,2'acid -disulphonic aicd and D represents the radical of a second monoazo entity defined by the removal of the group Z from the compound represented by formula (22).

It will be appreciated that the preferred sub-class of dyestuffs as defined above comprises two main types viz.

a. Dyestuffs of formula (22) in which $R^9$ is of the structure

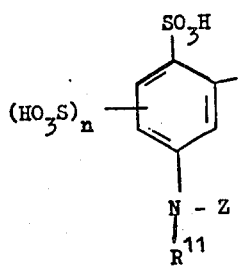

where $n$, $R^{11}$ and Z have the meanings given above, in combination with $R^{10}$ selected from $C_{1-6}$ alkyl benzyl, sulphobenzyl, phenylethyl or sulphophenylethyl and b. Dyestuffs of formula (22) in which $R^9$ is of the structure

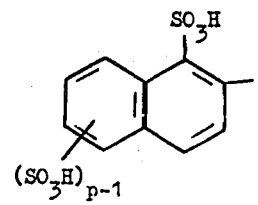

where $p$ has the meaning given above, in combination with $R^{10}$ selected from $$-(CH_2)_r-N-Z,$$
$$R^{11}$$

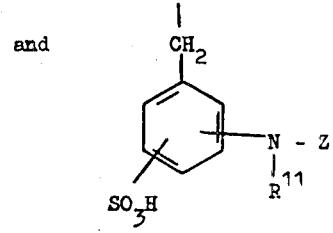

where $r$, $R^{11}$ and Z have the meanings given above.

It will be further appreciated that the preferred sub-class of reactive dyes given above consists of monoazo dyes except in the case where Z is

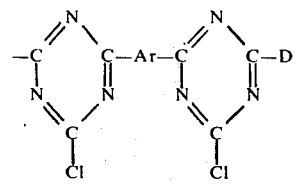

Ar and D having the meanings given above, in which case the dyestuffs contain two azo groups per molecule and are represented by the following formula (23) and (24) corresponding to types (a) and (b) defined above, respectively.

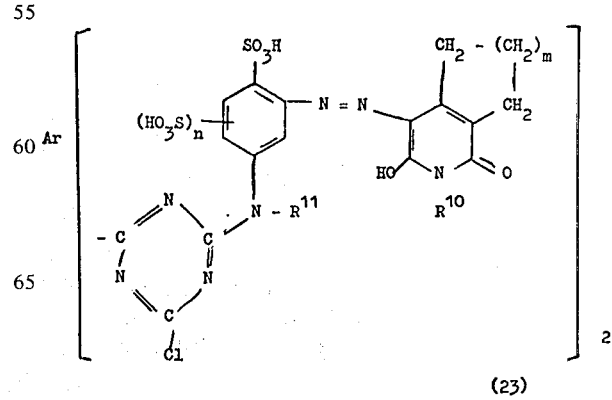

(23)

where Ar has the meaning given above and $m$, $n$, $R^{10}$, $R^{11}$ have the meanings given for type (a) above.

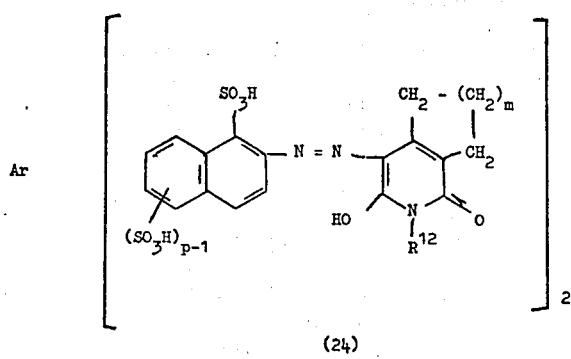

where Ar has the meaning given above and $R^{12}$ is selected from

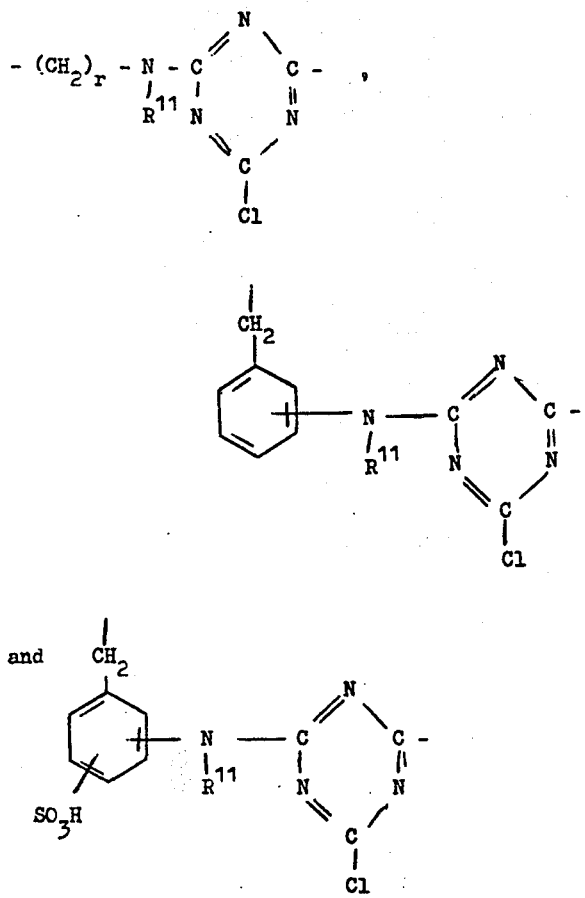

in which the —CH₂ group is joined to the nitrogen of the pyridone ring and $m$, $r$ and $p$ have the meaning given above for type (b).

The preferred sub-class of reactive dyes are characterized by a combination of extremely bright greenish or reddish yellow shades and, in some cases, very good fastness to bleach.

The new dyestuffs may be obtained by a variety of methods. In the general case they may be obtained by coupling a diazotized aromatic amine or tetraazotized aromatic diamine containing such groups with a compound of the formula:

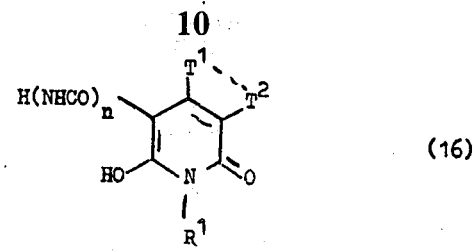

wherein $R^1$, $T^1$ and $T^2$ have the meanings stated above and $n$ is 0 or 1.

Compounds of formula (16) can be obtained by reacting a compound of the formula:

with cyanacetic ester and an amino compound of formula $RNH_2$ to form a compound of the formula:

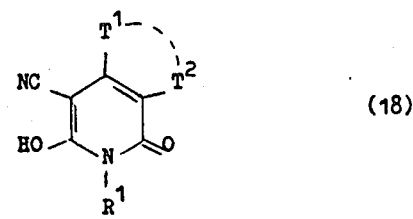

and subsequently heating in mineral acid e.g. 70–100% sulphuric acid, 15–30% hydrochloric acid and syrupy phosphoric acid whereby the cyano group is converted to aminocarbonyl or replaced by a hydrogen atom. The following table names compounds of formula (17) together with the derived meaning of $T^1 - T^2$:

| | |
|---|---|
| 2-ethoxycarbonyl-cyclopentanone | trimethylene |
| 2-ethoxycarbonyl-cyclohexanone | tetramethylene |
| 2-ethoxycarbonyl-cycloheptanone | pentamethylene |
| 2-ethoxycarbonyl-α-tetralone | 2,ω-ethylphenylene (formula 2c above) |
| 3-ethoxycarbonyl-β-tetralone | ω,ω'-o-xylylene (formula 2b above) |
| 6-ethoxycarbonylhydrindan-7-one | 2,ω-tolylene (formula 2a above) |

As examples of aromatic amines and diamines which may be used, there may be mentioned:

4-aminoazobenzene mono- and di-sulphonic acids,
4-amino-2-methyl-5-methoxyazobenzene-3'-sulphonic acid,
orthanilic, metanilic and sulphanilic acids,
2-, 3- and 4-aminobenzoic acids,
aniline-2,4-, -2,5- and -3,5-disulphonic acids,
2,5-dichloroaniline-4-sulphonic acid,
4-methoxy aniline-2- and -3-sulphonic acids,
2-methoxy aniline-5-sulphonic acid,
5-amino-2-hydroxy-3-sulphobenzoic acid,
4- and 5-acetylaminoaniline-2-sulphonic acids,
4- and 5-benzoylaminoaniline-2-sulphonic acids,
5-acetylamino-2-aminobenzoic acid,
4- and 5-(2',4'-dichloro-s-triazin-6'-ylamino)-aniline-2-sulphonic and 2,5- and 2,4-disulphonic acids,
4- and 5-(2'-chloro-4'-amino-s-triazin-6'-ylamino)aniline-2-sulphonic and 2,5- and 2,4-disulphonic acids, 4- and 5-(2'-chloro-4'-metanilino-s-triazin-6'-ylamino) aniline-2-sulphonic and 2,5- and 2,4-disulphonic acids,
4- and 5-(2'-chloro-4'-sulpho-o-toluidino-s-triazin-6'-ylamino) aniline-2-sulphonic and 2,5- and 2,4-disulphonic acids,
chloro- and nitro-aniline sulphonic acids,
aniline-5-sulphonanilide-2-sulphonic acid,
aniline-5-sulphon-N- ethylanilide-2-sulphonic acid,
4-amino-4'-nitrodiphenylamine-2'-sulphonic acid,
4-amino-2'-nitrodiphenylamine-4'-sulphonic acid,
1-aminonaphthalene-3-,4-, -5-, -6-, 7- and 8-sulphonic acids,
2-aminonaphthalene-1-, -4-, -5-, -6-, -7- and -8- sulphonic acids,
1-aminonaphthalene-aminonaphthalene-2,7-, 3,6-, 3,8-, 4,6- and 4,7- disulphonic acids,
2-aminonaphthalene-1,5-, -3,6-, -4,8-, -5,7- and -6,8-disulphonic acids,
1- and 2-aminonaphthalene trisulphonic acids,
4-nitro-4'-aminostilbene-2,2'-disulphonic acid,
4- and 5- sulpho-2-aminobenzoic acids,
6-chloro-, 6-nitro- and 6-acetylamino-2-aminophenol-4-sulphonic acids,
2-aminophenol-4- and -5-sulphonic acids and 4,6-disulphonic acid,
3-amino-3-hydroxy-6-sulphobenzoic acid,
4-chloro- and 4-nitro-2-aminophenol-6-sulphonic acids,
1-amino-2-hydroxynaphthalene-4-sulphonic acid,
6-nitro-1-amino-2-hydroxynaphthalene-4-sulphonic acid,
1,3-phenylene diamine -4,6- disulphonic acid,
1,4-phenylene diamine-2,5-disulphonic acid,
4,4'-diaminodiphenyl-2- and 3-sulphonic acids,
4,4'-diaminodiphenyl-2,2'- and -3,3'-disulphonic acids,
2,6-naphthylene diamine-1,5- and -3,7-disulphonic acids,
6-acetylamino-2-naphthylamine-4,8-disulphonic acid,
4,4'-diaminodiphenyl urea-2,2'-and 3,3'-disulphonic acids,
and 4,4'-diaminostilbene-2,2'-disulphonic acid.

The new dyestuffs wherein R or R¹ of formula (2) contains an acylamino group can, after hydrolysis to form an amino group, be converted to a cellulose-reactive dyestuff by condensation with the anhydride or halide of an acid of which the acid radical contains a substituent capable of chemically reacting with the fibre to form a chemical bond, or a heterocyclic compound which contains a halogen atom attached to a carbon atom of the heterocyclic nucleus and also a reactive substituent of the kind just stated.

As examples of halides or anhydrides of acids or heterocyclic compounds which may be used, there may be mentioned, for example, carbyl sulphate and the anhydrides or acid halides of α-β-unsaturated aliphatic acids such as chloromaleic anhydride, propiolyl chloride and acryloyl chloride, the acid chlorides of halogenated aliphatic acids e.g.

chloroacetyl chloride,
sulphochloroacetyl chloride,
β-bromo and β-chloro-propionyl chlorides,
α-β-dichloro and-dibromo-propionyl chlorides,
2,2,3,3-tetrafluorocyclobutane carbonyl chloride,
β-(2,2,3,3-tetrafluorocyclobutyl)acryloyl chloride,
2,3,3-trifluorocyclobut-1-ene carbonyl chloride,
β-(2,3,3-trifluorocyclobut-1-enyl)acrylyl chloride, also heterocyclic compounds which contain at least 2 nitrogen atoms in the heterocyclic rings and which contain 2 or more halogen, especially chlorine atoms in the ortho positions to the nitrogen atoms, e.g.

2:3-dichloro-quinoxaline-5- and -6- carbonyl chlorides,
2:3-dichloroquinoxaline-5- and -6- sulphonyl chlorides,
2:4-dichloro-quinazoline-6- and 7- sulphonyl chlorides,
2:4:6-trichloro-quinazoline-7- and 8-sulphonyl chlorides,
2:4:7- and 2:4:8-trichloro-quinazoline-6-sulphonyl chlorides,
2:4-dichloro-quinazoline-6-carbonyl chloride,
1:4-dichloro-phthalazin-6-carbonyl chloride,
2:4-dichloro-pyrimidine-5-carbonyl chloride,
β-(4:5-dichloro-pyridazonyl-1-)-propionyl chloride,
1-(4'-chloroformylphenyl)-4:5-dichloro-6-pyridazone,
1-4'-chlorosulphonylphenyl-4:5-dichloro-6-pyridazone,
2:4:6-tribromo and trichloro-pyrimidines,
2:4:5:6-tetrachloropyrimidine,
5-methyl-2-:4:6-trichloropyrimidine,
5-nitro-2:4:6-trichloropyrimidine,
2:4-dichloro-5-nitro-6-methyl-pyrimidine,
2:4-dichloro-5-nitropyrimidine,
2:4:6-trichloro-5-cyanopyrimidine,
5-ethoxycarbonyl-2:4-dichloropyrimidine,
2:4-dichloropyrimidine-5-carbonyl chloride,
cyanuric bromide,
cyanuric chloride:

also the primary condensation products of cyanuric bromide or cyanuric chloride with ammonia, an alkali metal sulphite or thiocyanate or an organic mercaptan, hydroxy compound or an organic primary or secondary amine, for example:

methanol,
ethanol,
iso-propanol,
phenol,
o-, m- and p-chlorophenols,
o-, m- and p-cresols,
o-, m- and p-sulphopenols,
thiophenol,
thioglycollic acid,
di-methyldithiocarbamic acid,
mercaptobenzthiazole,
thioacetamide,
methyl-,
dimethyl-,
ethyl-,
diethyl-,
n-propyl,
iso-propyl,
butyl-,
hexyl and cyclohexylamines,
toluidine,
piperidine,
morpholine,
methoxyethylamine,
ethanolamine,
aminoacetic acid,
aniline -2:4-,
2:5- and 3:5-disulphonic acids,
orthanilic,
metanilic and sulphanilic acids,
2-, 3- and 4- aminobenzoic acids,
4- and 5-sulpho2-aminobenzoic acids, 4- and 5- sulpho-o-toluidines,
5-amino-2-hydroxybenzoic acid,
2-amino-ethanesulphonic acid,
amino-naphthalene mono- and disulphonic acids and N-methylaminoethane sulphonic acid; also, the secondary condensation products of cyanuric chloride with:

alkali metal sulphites,
alkali metal thiocyanates
phenols and thiophenols containing an electronegative substituent, and compounds of the formula:

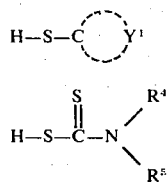

and

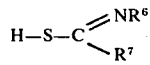

wherein $Y^1$, $R^4$, $R^5$, $R^6$ and $R^7$ have the meanings stated above.

The cellulose-reactive dyes of formula (2) wherein the cellulose-reactive group is a s-triazine nucleus substituted by a chlorine or bromine atom and an amino or substituted amino group can also be obtained by reacting a cellulose-reactive dye of formula (2) containing a dichloro- or dibromo-s-triazine group with ammonia or an amine.

The cellulose-reactive dyes of formula (2) wherein the cellulose-reactive group is a s-triazine nucleus substituted by $SO_3H$, a quaternary ammonium group or a group of formulae 3, 4 and 5, can be obtained by reacting a cellulose-reactive dye of formula (2) containing a s-triazine group substituted by at least one chlorine or bromine atom with an alkali metal salt of sulphurous acid, a tertiary amine or a compound of formulae 19, 20 and 21.

The new dyestuffs containing sulphonic acid groups and a fibre-reactive group are valuable for the dyeing and printing of cellulose, polyamide and wool textile materials with which they react in the presence of alkali and, if necessary, the action of heat. Textiles dyed with the new reactive dyes show good fastness to washing and in many cases, to bleaching treatments. They also show good resistance to acids and alkalies.

The invention is illustrated but not limited by the following Examples in which parts are by weight and the ratio w/v is in the ratio of grams to cc.:

EXAMPLE 1

2.68 parts of 1,3-phenylenediamine-4,6-disulphonic acid are dissolved in 100 parts of water by adding 2N sodium carbonate solution until the pH is at 4–5. The solution is cooled to 0°–5° and added to a stirred suspension of 1.95 parts of cyanuric chloride in a mixture of 10 parts of acetone, 40 parts of ice, 40 parts of water and one part of a dispersing agent. The mixture is stirred at 0°–5° for 1½ hours, the pH being maintained at 4–5 by the occasional addition of 2N sodium carbonate solution. 5 parts of hydrochloric acid (36°Tw) are added and the solution is diazotized by the addition of a small excess of sodium nitrite solution. Excess nitrous acid is decomposed by addition of sulphamic acid solution.

2.36 parts of 5-aminocarbonyl-3,4-tetramethylene-1-ethyl-6-hydroxypyrid-2-one are dissolved in 50 parts of water by addition of sodium carbonate solution until the pH is 8–9. The solution is cooled to 0°–5°C and the solution from paragraph 1 is added. The pH is slowly raised to 6–7 by addition of sodium carbonate solution and the mixture is stirred at 0°–5°C, pH 6–7 for 1 hour. A solution of 8 parts of disodium hydrogen phosphate and 4 parts of potassium dihydrogen phosphate in 50 parts of water is added and the dyestuff is precipitated by the addition of 10% w/v sodium chloride. The precipitate is filtered off, washed with 50 parts of 10% brine solution, mixed with 1 part of disodium hydrogen phosphate and 0.5 parts of potassium dihydrogen phosphate and dried in vacuo at room temperature. The product contains 1.8 moles of hydrolyzable chlorine per azo group and colors cellulosic fibres in conjunction with an acid-binding agent, in brilliant greenish-yellow shades which have good fastness to light, washing, and bleaching treatments.

The 5-aminocarbonyl-3,4-tetramethylene-1-ethyl-6-hydroxypyrid-2-one used in the above example can be obtained as follows:

A mixture of 28.2 parts of ethyl cyanoacetate, 42.5 parts of 2-ethoxycarbonylcyclohexanone and 100 parts of 70% aqueous ethylamine are stirred at 60°–65°C for 16 hours, then evaporated in vacuo. The residue is suspended in 400 parts of water and extracted twice with 100 parts of ether. The aqueous solution is treated with charcoal, filtered and acidified. The precipitate of 5-cyano-3,4-tetramethylene-1-ethyl-6-hydroxypyrid-2-one is collected and dried. Found: m.p. 188°–190°C, C = 65.3; H = 6.9; N = 12.5%. $C_{12}H_{14}O_2N_2$ requires C = 66.0; H = 6.5; N = 12.8%.

9.2 parts of this product are dissolved in 54 parts of 96% sulphuric acid and the solution is stirred at 60°C for 12 hours, then poured into ice-water. The mixture is stirred for 2 hours, and the precipitate of 5-aminocarbonyl-3,4-tetramethylene-1-ethyl-6-hydroxypyrid-2-one collected and dried. Found: m.p. 124°–125°C. C = 59.6; H = 6.9; N = 11.4%. $C_{12}H_{16}O_3N_2$ requires C = 61.0; H = 6.8; N = 11.9%.

EXAMPLE 2

2.68 parts of 1,3-phenylenediamine-4,6-disulphonic acid are condensed with 1.95 parts of cyanuric chloride and the product is diazotized as described in Example 1.

2.22 parts of 5-aminocarbonyl-3,4-trimethylene-1-ethyl-6-hydroxypyrid-2-one are dissolved in 50 parts of water by addition of sodium carbonate solution until the pH is 8–9. The solution is cooled to 0°–5° and solution from paragraph 1 is added. The pH is slowly raised to 6–7 by addition of sodium carbonate solution and the mixture is stirred at 0°–5°, pH 6–7 for ½ hour. 2.5 parts of 2-aminonaphthalene-5-sulphonic acid are added and the mixture is stirred at 30°–40°C and pH 6–7 for 1 hour. It is then heated to 50°–60°, salted to 20% w/v sodium chloride, cooled to 10° and the product collected by filtration, washed with 50 parts of 20% brine solution and dried in vacuo at 40°. The product contains 1.18 moles of reactive chlorine per azo group and colors cellulose fibres when applied in the presence of an acid binding agent in brilliant greenish-yellow shades having excellent fastness to light and washing treatments.

5-aminocarbonyl-3,4-trimethylene-1-ethyl-6-hydroxypyrid-2-one can be obtained as follows.

28.2 parts of ethyl cyanoacetate are added to 100 parts of 70% aqueous ethylamine and the solution is stirred vigorously while 39 parts of 2-ethoxycarbonyl-cyclopentanone are added. The mixture is stirred at 60°–65° for 16 hours and then evaporated to dryness in vacuo. The residual syrup is suspended in 400 parts of water and extracted twice with 100 parts of ether. The aqueous fraction is treated with charcoal, filtered and acidified to Congo Red with hydrochloric acid (36°Tw). The precipitate of 5-cyano-3,4-trimethylene-1-ethyl-6-hydroxypyrid-2-one is collected and dried. Found: m.p. 234° (dec.), C = 63.9; H = 6.4; N = 14.3%. $C_{11}H_{12}O_2N_2$ requires C = 64.7; H = 5.9; N = 13.7%. 2.04 parts of this product are added to 25 parts of 96% sulphuric acid and the solution is stirred for 16 hours at 50°–55° then poured into 200 parts of ice-water. The mixture is stirred for 2 hours at 0°–5° and the precipitate of 5-aminocarbonyl-3,4-trimethylene-1-ethyl-6-hydroxypyrid-2-one is collected and dried in vacuo. Found: m.p. 187°–190°. C = 59.0; H = 6.4; N = 12.5%. $C_{11}H_{14}O_3N_2$ requires C = 59.4; H = 6.35; N = 12.6%.

Further examples of the invention may be prepared by condensing the diamine listed in column II with one equivalent of the acylating agent listed in column III, the product then being diazotized and coupled with the coupling component in column IV in similar manner to Example 1. Column V describes the shade on cellulosic fibres when the dyestuff is applied to the fibre in the presence of an acid-binding agent.

| I Example | II Diamine | III Acylating agent | IV Coupling Component | V Shade |
| --- | --- | --- | --- | --- |
| 3 | 1,3-phenylenediamine-4-sulphonic acid | 2,4-dichloro-6-m-sulphoanilino-s-triazine | 1-ethyl-6-hydroxy-3,4-tetramethylenepyrid-2-one | Greenish-yellow |
| 4 | " | 2,4-dichloro-6-[2',5'-disulphoanilino]-s-triazine | 6-hydroxy-1-methyl-3,4-trimethylenepyrid-2-one | " |
| 5 | 1,4-phenylenediamine-2,5-disulphonic acid | 2,4,6-trichloro-5-cyanopyrimidine | 6-hydroxy-1-n-propyl-3,4-trimethylenepyrid-2-one | Reddish-yellow |
| 6 | 1,4-phenylenediamine-4-sulphonic acid | 2,4-dichloro-6-N-w-sulphomethylanilino-s-triazine | 1-n-butyl-6-hydroxy-3,4-pentamethylenepyrid-2-one | " |
| 7 | 1,3-phenylenediamine-4,6-disulphonic acid | 2,4,5,6-tetrachloro-pyrimidine | 5-aminocarbonyl-1-benzyl-6-hydroxy-3,4-tetramethylene-pyrid-2-one | Greenish-yellow |
| 8 | " | 2,4,6-trifluoro-5-chloropyrimidine | 5-aminocarbonyl-2,6-dihydroxy-3,4-trimethylenepyridine | " |
| 9 | " | 4,5-dichloro-6-methyl-2-methylsulphonyl pyrimidine | " | " |
| 10 | " | 2,4,6-trichloro pyrimidine | 5-aminocarbonyl-1-ethyl-6-hydroxy-3,4-tetramethylene-pyrid-2-one | " |
| 11 | 1,3-phenylenediamine-4,6-disulphonic acid | 5-bromo-2,4,6-trichloropyrimidine | 5-aminocarbonyl-1-ethyl-6-hydroxy-3,4-tetramethylene-pyrid-2-one | Greenish-yellow |
| 12 | " | 2,4-dichloropyrimidine-5-carbonyl chloride | " | " |
| 13 | " | 2,4-dichloropyrimidine-5-sulphonyl chloride | " | " |
| 14 | " | tetrafluorocyclobutane carbonyl chloride | " | " |
| 15 | " | trifluorocyclobutene carbonyl chloride | " | " |
| 16 | " | β-(tetrafluorocyclobutyl)-acryloyl chloride | " | " |
| 17 | " | β-(trifluorocyclobutenyl)-acryloyl chloride | " | " |
| 18 | " | 2-chlorobenzthiazole-6-carbonyl chloride | " | " |
| 19 | " | 2,4-dichloro-6-[6'-sulphonaphthyl-2-amino]-s-triazine | 1-ethyl-6-hydroxy-3,4-tetramethylenepyrid-2-one | " |
| 20 | 1,3-phenylenediamine-4,6-disulphonic acid | 2,4-dichloro-6-[5',7'-disulphonaphth-2-ylamino]-s-triazine | 5-aminocarbonyl-6-hydroxy-1-methyl-3,4-tetramethylene-pyrid-2-one | Greenish-yellow |
| 21 | 1,3-phenylenediamine-4-sulphonic acid | 2,4-dichloro-6-p-sulphoanilino-s-triazine | 1-isopropyl-6-hydroxy-3,4-tetramethylenepyrid-2-one | " |
| 22 | " | 2,4-dichloro-6-[2',5'-disulphoanilino]-s-triazine | 1-n-propyl-6-hydroxy-3,4-tetramethylenepyrid-2-one | " |
| 23 | " | 2,4-dichloro-6-[5'-sulphonaphth-1-ylamino]-s-triazine | 5-aminocarbonyl-1-ethyl-6-hydroxy-3,4-tetramethylene-pyrid-2-one | " |
| 24 | 1,3-phenylenediamine-4,6-disulphonic acid | 2,4-dichloro-6-[6'-sulphonaphth-1-ylamino]-s-triazine | " | " |
| 25 | " | 2,4-dichloro-6-[7'-sulphonaphth-1-ylamino]-s-triazine | " | " |
| 26 | 4,6-diaminobenzene-1,3-disulphonic acid | 2,3-dichloroquinoxaline-5-sulphonyl chloride | 5-aminocarbonyl-6-hydroxy-1-methyl-3,4-tetramethylene-pyrid-2-one | " |
| 27 | " | 2,3-dichloroquinoxaline-6-sulphonyl chloride | " | " |
| 28 | 4,6-diaminobenzene-1,3-disulphonic acid | 2,3-dichloroquinoxaline-5-carbonyl chloride | 1-ethyl-6-hydroxy-3,4-trimethylene-pyrid-2-one | Greenish-yellow |
| 29 | " | 2,3-dichloroquinoxaline- | 6-hydroxy-1-n-propyl-3,4- | 4,6-diamino-benzene- |

-continued

| Example | Diamine | Acylating agent | Coupling Component | Shade |
|---|---|---|---|---|
| 30 | " | 6-carbonyl chloride 2,4-dichloroquinazolin-6-sulphonyl chloride | trimethylenepyrid-2-one 5-aminocarbonyl-6-hydroxy-1-methyl-3,4-pentamethylene pyrid-2-one | " |
| 31 | " | 2,4-dichloroquinazolin-7-sulphonyl chloride | 5-aminocarbonyl-1-ethyl-6-hydroxy-3,4-pentamethylene pyrid-2-one | " |
| 32 | 2,4-diaminobenzene sulphonic acid | 2,4,6-trichloroquinazolin-7-sulphonyl chloride | 6-hydroxy-1-(4'-sulphobenzyl)-3,4-tetramethylenepyrid-2-one | " |
| 33 | " | 2,4,6-trichloroquinazolin-8-sulphonyl chloride | 6-hydroxy-1-(4'-sulphophenyl-ethyl)-3,4-tetramethylene pyrid-2-one | " |
| 34 | 4,6-diaminobenzene-1,3-disulphonic acid | 2,4,7-trichloroquinazolin-6-sulphonyl chloride | 1-n-butyl-6-hydroxy-3,4-tetramethylenepyrid-2-one | " |
| 35 | " | 2,4,8-trichloroquinazolin-6-sulphonyl chloride | " | " |
| 36 | " | 1,4-dichlorophthalazine-6-carbonyl chloride | 1-ethyl-6-hydroxy-3,4-trimethylenepyrid-2-one | " |
| 37 | 2,4-diaminobenzene sulphonic acid | 1-(4'-chloroformylphenyl)-4,5-dichloro-6-pyridazone | 6-hydroxy-1-(4'-sulphobenzyl)-3,4-tetramethylenepyrid-2-one | Greenish-yellow |
| 38 | " | β-(4,5-dichloropyridazonyl-1-)propionyl chloride | 5-aminocarbonyl-6-hydroxy-1-(4'-sulphobenzyl)-3,4-tetramethylenepyrid-2-one | " |
| 39 | " | 1-(4'-chlorosulphonyl-phenyl)-4,5-dichloro-6-pyridazone | 5-aminocarbonyl-6-hydroxy-1-(4'-sulphophenylethyl)-3,4-trimethylenepyrid-2-one | " |
| 40 | " | 6-methoxy-dct | " | " |
| 41 | 4,5-diaminobenzene-1,3-disulphonic acid | 6-(4'-sulphophenoxy)-dct | 1-ethyl-6-hydroxy-3,4-pentamethylenepyrid-2-one | " |
| 42 | " | 6-phenoxy-dct | " | " |
| 43 | " | 6-methylamino-dct | " | " |
| 44 | " | 6-β-hydroxyethylamino-dct | " | " |
| 45 | 2,4-diaminobenzene sulphonic acid | 6-(1',5'-disulphonaphth-7-ylamino)-dct | 5-aminocarbonyl-1-n-butyl-6-hydroxy-3,4-tetramethylene pyrid-2-one | " |
| 46 | " | 6-(1',3',6'-trisulpho-naphth-8-ylamino)-dct | " | " |
| 47 | 4,6-diaminobenzene-1,3-disulphonic acid | β-chloroethylsulphonyl-endomethylene cyclohexane carbonyl chloride | 5-aminocarbonyl-1-ethyl-6-hydroxy-3,4-tetramethylene pyrid-2-one | Greenish-yellow |
| 48 | 2,4-diaminobenzene sulphonic acid | 6-bis-β-hydroxyethyl-amino-dct | " | " |
| 49 | " | 6-N-methyl-N-β-sulphoethylamino dct | " | " |
| 50 | 4,6-diaminobenzene-1,3-disulphonic acid | 6-diethylamino-dct | 6-hydroxy-1-methyl-3,4-tetramethylenepyrid-2-one | " |
| 51 | " | 6-(N-methyl-3'-sulpho-phenylamino)-dct | 6-hydroxy-1-methyl-3,4-pentamethylenepyrid-2-one | " |
| 52 | " | 6-(4'-carboxyphenylamino)-dct | 5-aminocarbonyl-1-ethyl-6-hydroxy-3,4-tetramethylene pyrid-2-one | " |
| 53 | 2,4-diaminobenzene sulphonic acid | 6-(2'-methylphenylamino)-dct | aminocarbonyl-6-hydroxy-1-(4'-sulphobenzyl)-3,4-tetramethylenepyrid-2-one | " |
| 54 | 4,6-diaminobenzene-1,3-disulphonic acid | 6-(4'-methoxyphenylamino)-dct | 1-ethyl-6-hydroxy-3,4-tetramethylenepyrid-2-one | " | dct = 2,4-dichloro-s-triazine

EXAMPLE 55

2.68 parts of 1,3-phenylenediamine-4,6-disulphonic acid are condensed with 1.95 parts of cyanuric chloride and the product is diazotized and coupled with 2.36 parts of 5-aminocarbonyl-3,4-tetramethylene-1-ethyl-6-hydroxypyrid-2-one as described in Example 1.

1.85 parts of 4,4'-diaminostilbene-2,2'-disulphonic acid are dissolved in 50 parts of water at pH 7 and added to the solution obtained in paragraph 1. The mixture is stirred at 30°–35° for 1 hour, the pH being maintained at 6–7 by occasional addition of 2N sodium carbonate solution. The dyestuff is precipitated by salting to 15% w/v sodium chloride, collected by filtration, washed with 50 parts of 20% brine and dried in vacuo at 40°. The product contains 2.1 moles of hydrolyzable chlorine per mole of dyestuff and when applied to cellulosic fibres in conjunction with an acid-binding agent, dyes the fibre in brilliant greenish-yellow shades with good fastness to washing and light.

Further examples of the invention are obtained if the 4,4'-diaminostilbene-2,2'-disulphonic acid in the above example be replaced by equivalent amounts of

| | |
|---|---|
| 4,4'-diaminodiphenylurea-2,2'-disulphonic acid | Example 56 |
| benzidine-2,2'-disulphonic acid | Example 57 |
| 2,6-diaminonaphthalene-4,8-disulphonic acid | Example 58 |
| 4,4'-diaminodiphenylether | Example 59 |
| 4,4'-diaminodiphenylsulphone | Example 60 |
| 4,4'-diaminodiphenoxyethane-2,2'-disulphonic acid | Example 61 |
| 4,4'-diaminodiphenylsulphide-2,2'-disulphonic acid | Example 62 |
| 1,3-diaminobenzene-4,6-disulphonic acid | Example 63 |

EXAMPLE 64

2.68 parts of 1,3-phenylenediamine-4,6-disulphonic acid are condensed with 1.95 parts of cyanuric chloride and the product is diazotized and coupled with 2.36 parts of 5-aminocarbonyl-3,4-tetramethylene-1-ethyl-6-hydroxypyrid-2-one as described in Example 1.

2.07 parts of 1,3-phenylenediamine-4-sulphonic acid are dissolved in 50 parts of water at pH 7 and added to the solution obtained in paragraph 1. The mixture is stirred and slowly warmed to 30° at which temperature it is stirred for 1 hour. The pH is then raised to 6.5 by the addition of sodium carbonate and stirred at 30°, pH 6–7 for a further ½ hour. The solution is cooled to 0°–5° and added to a stirred suspension of 2.75 parts of cyanuric chloride, 30 parts of ice, 30 parts of water and 1 part of dispersing agent. The mixture is stirred at 0°–5° for 8 hours, the pH being maintained at 6–7 by the occasional addition of 2N sodium carbonate. The mixture is screened and 10 parts of ammonia liquor (d 0.880) are added to the filtrate and the solution so obtained stirred at 30° for 1 hour. The pH is reduced to 6.5 by the addition of 2N hydrochloric acid and the dyestuff is precipitated by salting to 20% w/v sodium chloride. The product is filtered, washed with 30 parts of 20% brine and dried in vacuo. Upon analysis it is found to contain 1.9 parts of hydrolyzable chlorine per mole of dyestuff and, when applied to cellulosic fibres in conjunction with an acid-binding agent, to dye the fibres in brilliant greenish-yellow shades with good fastness properties.

Further examples of the invention are obtained if the 1,3-phenylenediamine-4-sulphonic acid in the above example is replaced by an equivalent quantity of

| | |
|---|---|
| 1,4-phenylenediamine-2-sulphonic acid | Example 65 |
| 1,4-phenylenediamine-2,5-disulphonic acid | Example 66 |
| 1,3-phenylenediamine-4,6-disulphonic acid | Example 67 |

EXAMPLE 68

3.03 parts of 2-aminonaphthalene-1,5-disulphonic acid are stirred with 75 parts of water and caustic liquor (s.g. 1.35) is added dropwise until the pH of the solution is 8. 5.25 Parts of 2N sodium nitrite solution are added, the solution is cooled to 0°–5°, 75 parts of ice are added and the mixture stirred vigorously while being acidified with 10 parts of hydrochloric acid (s.g. 1.18). The suspension is stirred at 0°–5° for ½ hour and then the slight excess of nitrous acid is destroyed by the addition of a few drops of a 10% aqueous solution of sulphamic acid. The suspension of the diazonium salt is added to a stirred solution of 2.29 parts of 1-β-amino-ethyl-6-hydroxy-3,4-tetramethylenepyrid-2-one in 75 parts of 16% sulphuric acid. The mixture is stirred vigorously at 0°–5° while the pH is gradually raised to 2.5 by the dropwise addition of ammonia solution (s.g. 0.880). The yellow precipitate is filtered off, washed with 50 parts cold water and suspended in 100 parts of cold water by stirring. Lithium hydroxide is added until a clear solution is formed of pH 11–12. This solution is added dropwise during 10 minutes to a suspension of cyanuric chloride prepared by adding a solution of 4 parts of cyanuric chloride in 15 parts of acetone to a stirred mixture of 50 parts of ice, 50 parts of water and 1 part of dispersing agent. The pH of the mixture during the course of the addition of the dyebase solution and for a further ½ hour is maintained at 9–10. At the end of this time the pH is adjusted to 7 with dilute hydrochloric acid, a solution of 3 parts of potassium dihydrogen orthophosphate and 1.5 parts of disodium hydrogen orthophosphate in 20 parts of water is added, and the mixture is screened. The clear yellow filtrate is salted to 20% w/v sodium chloride and the product is collected by filtration, pasted with 0.8 parts of potassium dihydrogen orthophosphate and 0.4 parts of disodium hydrogen orthophosphate and dried in vacuo. When applied to cellulosic fibres in conjunction with an acid binding agent, the fibres are dyed in greenish yellow shades fast to washing, chlorine and light.

The solution of 1-β-aminoethyl-6-hydroxy-3,4-tetramethylene pyrid-2-one in dilute sulphuric acid can be made as follows. 2.56 Parts of 1-β-aminoethyl-5-cyano-3,4-tetramethylenepyrid-2-one and 15 parts of 80% sulphuric acid are stirred for 3 hours at 130°. After cooling the solution is added to 60 parts of ice. 1-β-aminoethyl-5-cyano-3,4-tetramethylenepyrid-2-one can be made in a similar manner to that described for 5-cyano-3,4-tetramethylene-1-ethyl-6-hydroxypyrid-2-one in Example 1, by substituting ethylamine with an equivalent quantity of ethylene diamine.

Further examples of the invention are described in the following table in which compounds of the general formula

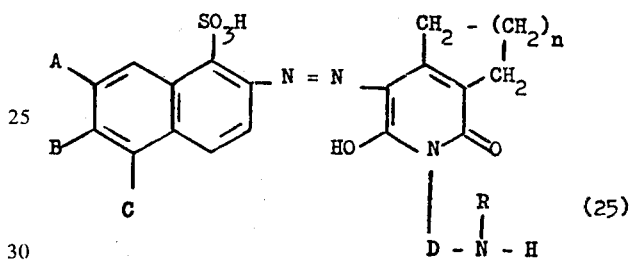

(25)

in which the values of A, B, C, D, R and n are given in the appropriate columns, are acylated with the agent named in column 8 to give dyestuffs having, on cellulose, greenish-yellow shades of similar fastness properties to the above example.

Compounds of formula (25) are obtained by following the procedure outlined above namely coupling diazotized amines of formula

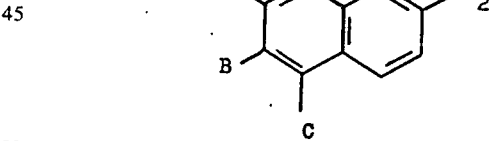

with aminoalkyl pyridines of the formula

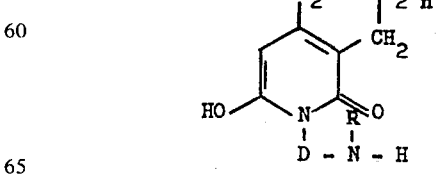

themselves obtained by the method given above.

| Example | A | B | C | D | R | n | Acylating Agent |
|---|---|---|---|---|---|---|---|
| 69 | H | H | SO₃H | CH₂CH₂ | H | 3 | 6-(4'-sulphophenoxy)-dct |
| 70 | " | " | H | " | " | 2 | 6-(3',5'-disulphophenylamino)-dct |
| 71 | SO₃H | " | SO₃H | CH₂— | " | 1 | 6-amino-dct |
| 72 | H | SO₃H | H | CH₂CH₂ | " | 2 | cyanuric chloride |
| 73 | " | " | " | " | CH₂CH₂OH | 2 | 6-(3'-sulphophenylamino)-dct |
| 74 | " | H | SO₃H | CH₂CH₂CH₂ | H | 2 | 6-(4'-sulphophenylamino)-dct |
| 75 | " | " | H | " | " | 3 | 6-(2'-methyl-5'-sulphophenylamino)-dct |
| 76 | SO₃H | " | SO₃H | CH₂CH₂ | CH₂CH₂OH | 3 | 6-(1'-sulphonaphth-6'-ylamino)-dct |
| 77 | " | " | " | " | H | 2 | 6-(2'-sulphonaphth-6'-ylamino)-dct |
| 78 | H | SO₃H | H | CH₂CH₂CH₂ | CH₃ | 2 | 6-(N'-ω-methanesulphonylphenylamino)-dct |
| 79 | " | H | " | " | H | 2 | 6-(1',3',6'-trisulphonaphth-8'-ylamino)-dct |
| 80 | " | " | SO₃H | CH₂CH₂ | " | 2 | 6-methoxy-dct |
| 81 | SO₃H | " | " | " | " | 1 | 6-isopropoxy-dct |
| 82 | H | SO₃H | H | " | CH₂CH₂OH | 2 | 6-[3'-(6''-amino-4''-chloro-s-triazin-2''-ylamino)-4'-sulphophenylamino]-dct |
| 83 | " | H | SO₃H | " | H | 2 | 6-[3'-4''-chloro-6''-(3'''-sulphophenylamino)-s-triazin-2''-ylamino -4'-sulphophenylamino]-dct |
| 84 | SO₃H | " | " | CH₂CH₂CH₂ | CH₃ | 3 | 6-[4'-(4''-chloro-6''-methoxy-s-triazin-2''-yl-amino)-3'-sulphophenoxy]-dct |
| 85 | H | SO₃H | H | CH₂— | H | 2 | 6-[3'-(4'',6''-dichloro-s-triazin-2'-ylamino)-4',6'-disulphophenylamino]-dct (½ mole) |
| 86 | " | H | SO₃H | CH₂CH₂ | " | 2 | 6-[4''-(4'',6''-dichloro-s-triazin-2'''-ylamino)-2',2''-disulphostilbene-4'-amino]-dct (½ mole) |
| 87 | " | " | " | " | CH₂CH₂OH | 2 | 6-[4''-(4'',6''-dichloro-s-triazin-2'''-ylamino)-2,2''-disulphodiphenylurea-4'-amino]-dct (½ mole) |
| 88 | SO₃H | " | " | CH₂CH₂CH₂ | H | 2 | 2,4,6-trichloropyrimidine |
| 89 | H | SO₃H | H | CH₂CH₂ | CH₂CH₂OH | 1 | tetrachloropyrimidine |
| 90 | " | " | " | " | H | 1 | 2,4,6-tribromopyridine |
| 91 | " | " | " | " | " | 2 | 5-cyano-2,4,6-trichloropyrimidine |
| 92 | SO₃H | H | SO₃H | " | H | 2 | 5-methyl-2,4,6-trichloropyrimidine |
| 93 | H | " | " | " | " | 2 | 5-nitro-2,4,6-trichloropyrimidine |
| 94 | H | H | SO₃H | CH₂CH₂ | H | 2 | 5-chloro-2,4,6-trifluoropyrimidine |
| 95 | " | " | " | " | " | 2 | 4,5-dichloro-6-methyl-2-methylsulphonyl pyrimidine |
| 96 | SO₃H | " | " | " | CH₂CH₂OH | 1 | 5-ethoxycarbonyl-2,4-dichloropyrimidine |
| 97 | " | " | " | " | " | 1 | 2,4-dichloropyrimidine-5-carbonyl chloride |
| 98 | H | " | " | CH₂CH₂CH₂ | H | 2 | 2,4-dichloropyrimidine-5-sulphonyl chloride |
| 99 | SO₃H | " | " | CH₂CH₂ | CH₃ | 2 | 2,3-dichloroquinoxalin-5-sulphonyl chloride |
| 100 | H | SO₃H | H | " | H | 3 | 2,3-dichloroquinoxalin-6-sulphonyl chloride |
| 101 | " | " | " | CH₂— | " | 1 | 2,3-dichloroquinoxalin-6-carbonyl chloride |
| 102 | " | H | SO₃H | CH₂CH₂ | CH₂CH₂OH | 1 | 2,3-dichloroquinoxalin-5-carbonyl chloride |
| 103 | SO₃H | " | " | " | " | 2 | 2,4-dichloroquinazolin-6-sulphonyl chloride |
| 104 | " | " | " | (CH₂)₄ | H | 2 | 2,4-dichloroquinazolin-6-carbonyl chloride |
| 105 | H | " | " | (CH₂)₅ | " | 3 | 2,4-dichloroquinazolin-7-carbonyl chloride |
| 106 | " | " | " | (CH₂)₆ | " | 2 | 2,4-dichloroquinazolin-7-sulphonyl chloride |
| 107 | " | " | " | CH₂CH₂ | " | 2 | 2,4,6-trichloroquinazolin-7-sulphonyl chloride |
| 108 | SO₃H | H | SO₃H | CH₂CH₂ | CH₂CH₂OH | 2 | 2,4,6-trichloroquinazolin-8-sulphonyl chloride |
| 109 | H | SO₃H | H | CH₂CH₂CH₂ | H | 2 | 2,4,7-trichloroquinazolin-6-sulphonyl chloride |
| 110 | " | " | " | " | CH₃ | 1 | 2,4,8-trichloroquinazolin-6-sulphonyl chloride |
| 111 | " | " | " | CH₂CH₂ | H | 2 | 1,4-dichlorophthalazin-6-carbonyl chloride |
| 112 | " | H | SO₃H | " | " | 2 | β-(4',5'-dichloropyridazonyl-1-)propionyl chloride |
| 113 | SO₃H | " | " | " | " | 2 | 1-(4'-chloroformylphenyl)-4,5-dichloro-6-pyridazone |
| 114 | " | " | " | " | " | 2 | 1-(4'-chlorosulphonylphenyl)-4,5-dichloro-6-pyridazone |
| 115 | H | " | " | " | " | 2 | 6-bis-β-hydroxyethylamino-dct |
| 116 | " | SO₃H | H | " | CH₂CH₂OH | 2 | 6-N-methyl-N-β-sulphoethylamino-dct |
| 117 | " | " | " | CH₂CH₂CH₂ | CH₃ | 1 | 6-diethylamino-dct |
| 118 | SO₃H | H | SO₃H | CH₂CH₂ | H | 2 | 6-(N-methyl-3'-sulphophenylamino)-dct |
| 119 | " | " | " | (CH₂)₆ | " | 2 | 6-(4'-carboxyphenylamino)-dct |
| 120 | " | " | " | CH₂CH₂ | " | 2 | 6-(2'-methylphenylamino)-dct |
| 121 | " | " | " | " | " | 2 | 6-(4'-methoxyphenylamino)-dct |
| 122 | H | SO₃H | H | CH₂— | H | 3 | 6-(4'-chlorophenylamino)-dct |
| 123 | " | " | " | CH₂CH₂ | CH₂CH₂OH | 2 | 6-β-hydroxyethylamino-dct |
| 124 | " | H | SO₃H | " | H | 2 | 6-γ-methoxypropylamino-dct |
| 125 | " | " | " | " | " | 2 | 6-(4'-β-sulphatoethylsulphonylphenylamino)-dct |
| 126 | " | " | " | " | " | 2 | 6-(3'-β-sulphatoethylsulphonylphenylamino)-dct |
| 127 | " | " | " | " | " | 2 | 5-bromo-2,4,6-trichloropyrimidine |
| 128 | " | " | " | " | " | 2 | 2,2,3,3-tetrafluorocyclobutyl carbonyl chloride |
| 129 | SO₃H | " | " | " | " | 2 | 2,3,3-trifluorocyclobut-1-enyl carbonyl chloride |
| 130 | H | SO₃H | H | " | " | 2 | β-(2,2,3,3-tetrafluorocyclobutyl)acryloyl chloride |
| 131 | " | " | " | CH₂CH₂CH₂ | " | 2 | β-(2,3,3-trifluorocyclobut-1-enyl)acryloyl chloride |
| 132 | " | " | " | CH₂CH₂ | " | 2 | β-chloroethylsulphonylendomethylene cyclohexane carbonyl chloride |
| 133 | " | H | SO₃H | " | CH₂CH₂OH | 2 | 6-anilino-dct |
| 134 | SO₃H | " | " | " | H | 2 | 2-chlorobenzthiazole-6-carbonyl chloride | dct = 2,4-dichloro-s-triazine

EXAMPLES 135–143

6.7 Parts of the dyestuff made as described for Example 68 are dissolved in 200 parts of water at 35°, pH 7. To the stirred solution is added a solution of 1.8 parts of 4,4'-diaminodiphenyl sulphide-2,2'-disulphonic acid in 50 parts of water at 35°, pH 7. The solution is stirred at 35°–40°, pH 6.5 – 7.5 for 2 hours, and the product isolated by cooling and salting to 20% w/v sodium chloride. The product is collected by filtration and dried. When applied to cellulosic fibres in conjunction with an acid binding agent, it dyes the fibres in greenish yellow shades fast to washing, light and chlorine.

Further examples of the invention are obtained if the 4,4'-diaminodiphenylsulphide-2,2'-disulphonic acid in the above example can be replaced by equivalent quantities of

| | |
|---|---|
| 4,4'-diaminodiphenylurea-2,2'-disulphonic acid | Example 136 |
| benzidine-2,2'-disulphonic acid | Example 137 |
| 2,6-diaminonaphthalene-4,8-disulphonic acid | Example 138 |
| 4,4'-diaminodiphenylether | Example 139 |
| 4,4'-diaminodiphenylsulphone | Example 140 |
| 4,4'-diaminodiphenoxyethane-2,2'-disulphonic acid | Example 141 |
| 4,4'-diaminostilbene-2,2'-disulphonic acid | Example 142 |
| 1,3-diaminobenzene-4,6-disulphonic acid | Example 143 |

We claim:
1. A dyestuff of the formula

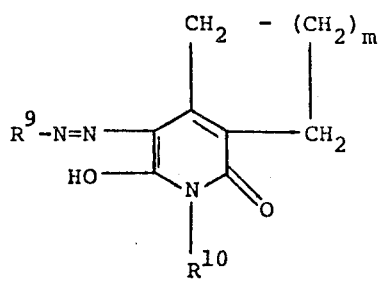

wherein
$m$ is 1, 2 or 3;
$R^9$ is selected from the group consisting of

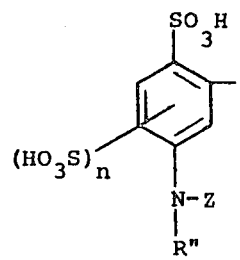

wherein $n$ is 0 or 1 and R" is hydrogen or lower alkyl and

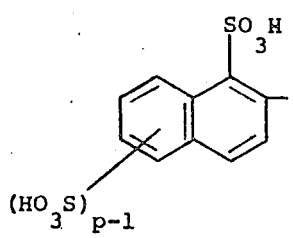

wherein $p$ is 1, 2 or 3;
$R^{10}$ is selected from the group consisting of $C_{1-6}$ alkyl, benzyl, sulphobenzyl, phenylethyl, sulphophenylethyl,

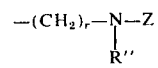

wherein $r$ is 2 to 6,

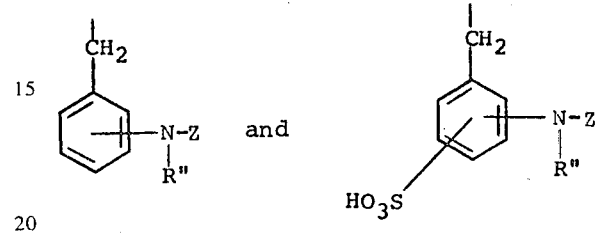

wherein R" has the meaning given above and the dyestuff as a whole contains only one group represented by Z; and Z is a cellulose-reactive group selected from the group consisting of
2,3-dichloroquinoxalin-5-sulphonyl,
2,3-dichloroquinoxalin-5-carbonyl,
2,3-dichloroquinoxalin-6-sulphonyl,
2,3-dichloroquinoxalin-6-carbonyl,
2,4-dichloroquinazolin-6-sulphonyl,
2,4-dichloroquinazolin-6-carbonyl,
2,4-dichloroquinazolin-7-sulphonyl,
2,4,6-trichloroquinazolin-7-sulphonyl,
2,4,6-trichloroquinazolin-8-sulphonyl,
2,4,7-trichloroquinazolin-6-sulphonyl,
2,4,8-trichloroquinazolin-6-sulphonyl,
1,4-dichlorophthalazin-6-carbonyl,
β(4,5-dichloropyridazon-1-yl) propionyl,
2,4-dichloropyrimidin-5-carbonyl,
4-(4',5'-dichloropyridazon-1-yl) phenylsulphonyl,
2,4-dichloropyrimid-6-yl,
2,4,5-trichloropyrimid-6-yl,
2,4-dichloro-5-cyanopyrimid-6-yl,
2,4-difluoro-5-chloropyrimid-6-yl,
5-chloro-6-methyl-2-methylsulphonylpyrimid-4-yl,
2,4-dichloro-5-bromopyrimid-6-yl,
2,4-dichloropyrimidin-5-sulphonyl,
2,2,3,3-tetrafluorocyclobutylcarbonyl,
2,3,3-trifluorocyclobut-1-enyl carbonyl,
β-(2,2,3,3-tetrafluorocyclobutyl) acryloyl,
β-(2,3,3-trifluorocyclobut-1-enyl) acryloyl,
2-chlorobenzthiazol-6-carbonyl,

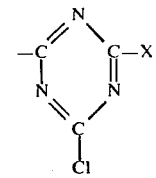

wherein X is Cl, NH$_2$, lower alkoxy, phenoxy, sulphophenoxy, lower alkylamino, di(lower alkyl)amino,

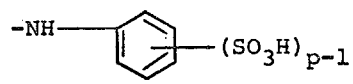

wherein p is 1, 2 or 3,

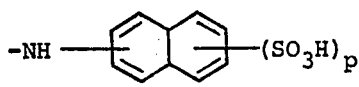

wherein p is 1, 2 or 3,

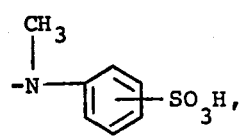

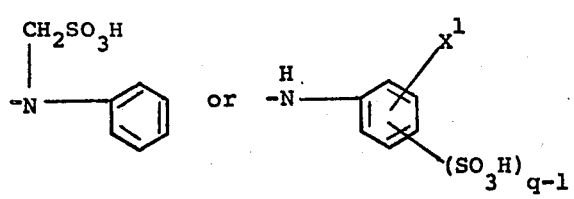

wherein $X^1$ is $CH_3$, Cl, $OCH_3$ or $CO_2H$ and q is 1 or 2,

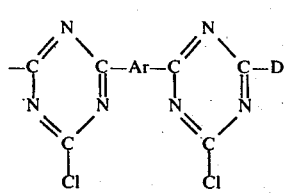

wherein q and X have the meanings given above, and

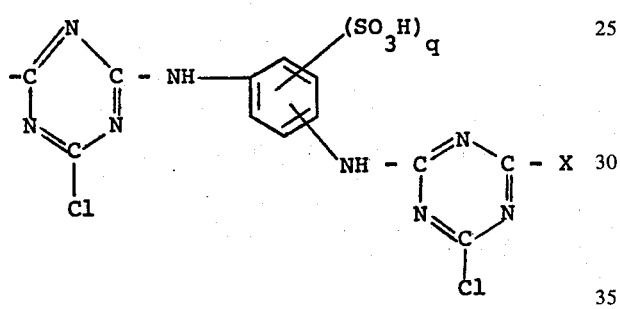

wherein Ar is the N,N'-divalent radical of a diamine selected from the group consisting of 4,4'-diaminodiphenylether, 4,4'-diamino diphenylsulphone, 4,4'-diaminodiphenoxyethane-2,2'-disulphonic acid, 2,6-naphthalene-4,8-disulphonic acid, benzidine-2,2'-disulphonic acid, 4,4'-diamino-diphenylurea-2,2'-disulphonic acid, 4,4'-diamino-stilbene-2,2'-disulphonic acid, 1,3-diaminobenzene-4,6-disulphonic acid and 4,4'-diaminodiphenylsulphide-2,2'-disulphonic acid, and D is a second monovalent monoazo entity of the formula

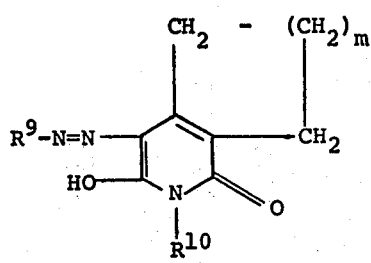

wherein m is 1, 2 or 3; $R^9$ is

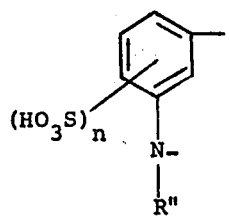

wherein n and R'' have the meaning given above or

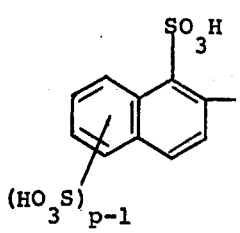

wherein p has the meaning given above; and $R_{10}$ is selected from the group consisting of $C_{1-6}$ alkyl, benzyl, sulphobenzyl, phenylethyl, sulphophenylethyl,

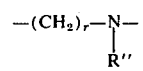

where r is 2 to 6,

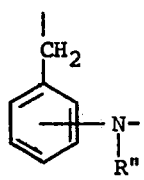 and 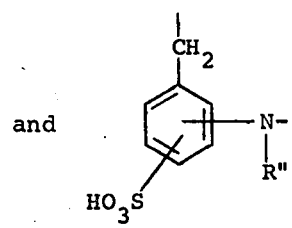

wherein R'' has the meaning given above.

2. A dyestuff as claimed in claim 1 in which $R^9$ is

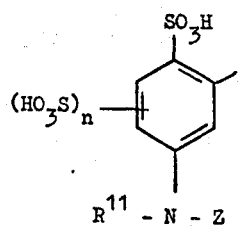

and $R^{10}$ is selected from the group consisting of $C_{1-6}$ alkyl, benzyl, sulphobenzyl, phenylethyl and sulphophenylethyl, where n, $R^{11}$ and Z have the meanings given in claim 1.

3. A dyestuff as claimed in claim 2 of the formula

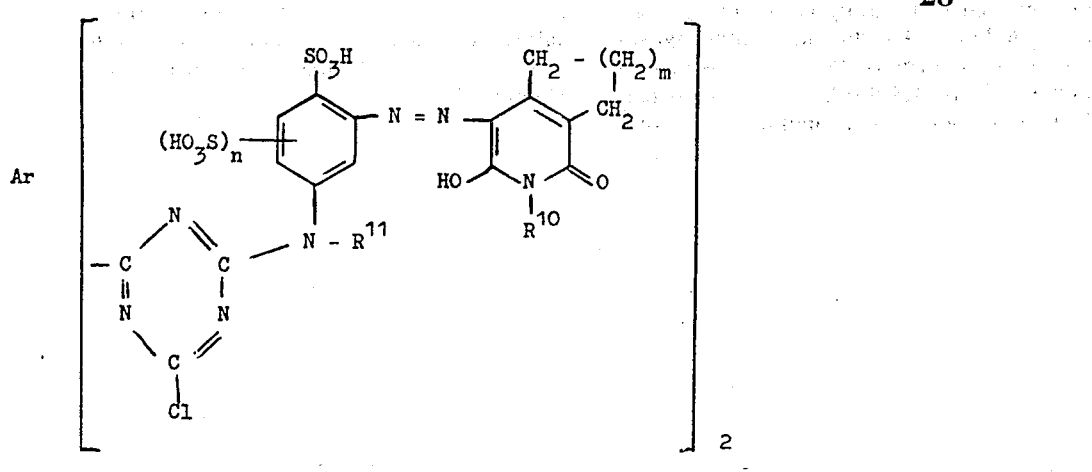

wherein m, n, R[10] and R[11] have the meanings given in claim 2.

4. A dyestuff as claimed in claim 6 in which R[9] is

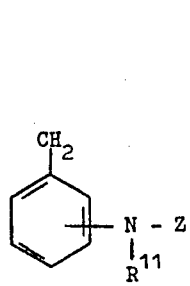

and R[10] is selected from the group consisting of $$-(CH_2)_r-\underset{R''}{N}-Z,$$

and where p, r, R[11] and Z have the meanings given in claim 1.

5. A dyestuff as claimed in claim 4 of the formula wherein R[12] is selected from the group consisting of

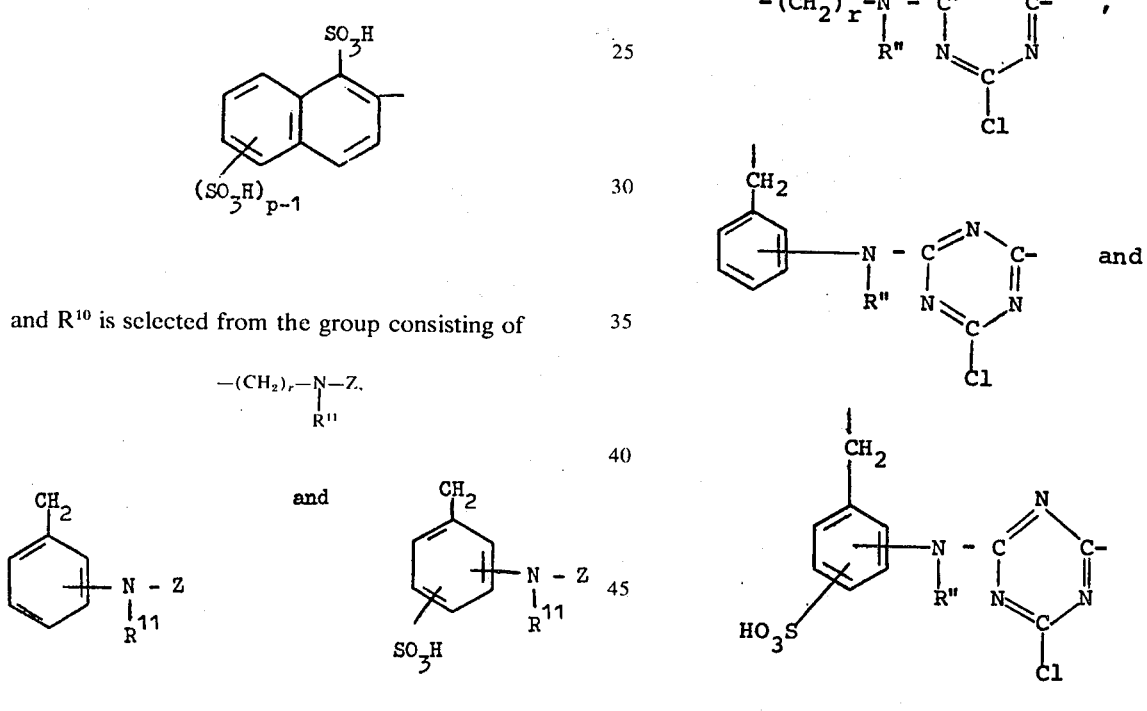

in which the $CH_2$ group is joined to the nitrogen of the pyridone ring, m, r, p and R'' have the meanings given in claim 4 and Ar is the N,N'-divalent radical

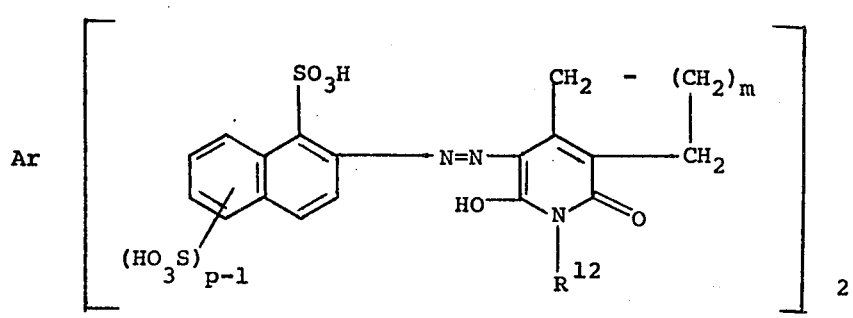

of a diamine selected from group consisting of 4,4'-diamino-diphenylether, 4,4'-diamino diphenylsulphone, 4,4'-diamino-diphenoxyethane-2,2'-disulphonic acid, 2,6-naphthalene-4,8-disulphonic acid, benzidine-2,2'-disulphonic acid, 4,4'-diaminodiphenylurea-2,2'-disulphonic acid, 4,4'-diaminostilbene-2,2'-disulphonic acid, 1,3-diaminobenzene-4,6-disulphonic acid and 4,4'-diaminodiphenylsulphide-2,2'-disulphonic acid.

* * * * *